United States Patent Office 3,538,039
Patented Nov. 3, 1970

3,538,039
POWDERED HEAT-CURABLE COMPOSITIONS OF (1) AN EPOXY-AMINE ADDUCT, (2) AN ANHYDRIDE AND (3) AN IMIDAZOLE
William L. Lantz, Metuchen, and Joseph P. Manasia, Union, N.J., assignors to Shell Oil Company, New York, N.Y., a corporation of Delaware
No Drawing. Filed Dec. 27, 1966, Ser. No. 604,551
Int. Cl. C08g 51/04
U.S. Cl. 260—37                12 Claims

ABSTRACT OF THE DISCLOSURE

Heat-curable compositions which are stable at room temperature but cure in 1–5 minutes at 275–300° F. to form flexible products having excellent mechanical and electrical properties comprise (1) an adduct of a polyepoxide and an amine, (2) a polyfunctional anhydride and (3) an activator for the anhydride (imidazole compound).

---

This invention relates to new powdered heat-curable epoxy resin compositions, to their preparation and use. More particularly, the invention relates to new powdered heat-curable epoxy resin compositions which can be cured at a very fast rate at moderate temperatures to give products of excellent properties, to their preparation and use, particularly in fluidized bed processes and as molding compositions.

Specifically, the invention provides new and particularly useful finely divided powdered heat-curable compositions which are stable at room temperature but cure in about 1–5 minutes at 275–300° F. to form flexible products having excellent mechanical and electrical properties. These new compositions comprise a dry homogeneous blend of (1) a special adduct of a polyepoxide, and preferably a liquid glycidyl polyether of a polyhydric phenol, and an amine, such as aminophenol, which adduct has a softening point of between about 79° C. and 125° C., and preferably 90° C. to 125° C. and a WPE of 400 to 932 and (2) a polyfunctional anhydride, such as trimellitic anhydride, and (3) an activator for the anhydride comprising a metal salt or a heterocyclic compound possessing in the ring a substituted imino group and a secondary amino group, such as an imidazole compound, and (4) if desired, fillers, pigments, and the like.

As a special embodiment, the invention provides a process for preparing the new heat-curable powdered compositions which comprises dry blending mixtures of the above-noted components in a pebble mill containing high-density media as the grinding media at a moderate temperature so as to produce a unique product comprising agglomerates of the particles of the reactants formed into a homogeneous composite which does not segregate on standing.

As a further special embodiment, the invention provides a process for utilizing the new compositions in a fluidized bed process wherein the article to be coated is heated and passed into a fluidized bed of the new heat-curable powdered composition, withdrawn and then subjected to brief heating to effect the final cure of the resinous coating on the article.

Epoxy molding compositions have been made in the past by mixing liquid epoxy resin, molten aromatic amine curing agent and various fillers at ambient temperature. The resulting high viscosity liquid molding material is then allowed to "B" stage. The resulting solid mass is then granulated and used in the molding operation. While such products produced relatively good moldings, the process had the following problems.

(1) Poor room temperature shelf life
(2) Poor hot hardness of parts out of the mold (low heat deflection temperature)
(3) Slow cure 2 minutes at 150° C. (depending on part size)

Some of these problems can be overcome by use of a blend of epoxy novolac resin and the aromatic amine curing agent. However, in solving some of these problems, one loses many of the advantages of the "B" stage products noted above, namely, mechanical properties, such as room temperature flexural, tensile and impact strengths, etc.

It is an object of the invention, therefore, to prepare new epoxy resin compositions and a method for their preparation. It is a further object to provide new heat-curable powdered epoxy resin compositions which are ideally suited for use as molding compositions and in fluidized bed processes. It is a further object to provide new powdered epoxy resin compositions which can be cured at a fast rate at moderate temperature. It is a further object to provide heat-curable epoxy resin compositions which have room temperature stability. It is a further object to provide heat-curable epoxy resin compositions which can be cured at a fast rate at moderate temperature. It is a further object to provide heat-curable epoxy resin compositions which have room temperature stability. It is a further object to provide heat-curable epoxy resin compositions which can be converted to products having excellent mechanical properties. It is a further object to provide epoxy resin compositions which can be converted to insoluble infusible products having excellent electrical properties. It is a further object to provide new epoxy resin compositons which can be converted to products having excellent hot hardness, low shrinkage and excellent impact strength. These and other objects of the invention will be apparent from the following detailed description thereof.

It has now been discovered that these and other objects are accomplished by the new powdered heat-curable epoxy resin compositions of the present invention comprising the dry homogeneous blend of (1) a special adduct of a polyepoxide, and preferably a liquid glycidyl polyether of a polyhydric phenol, and an amine, such as aminophenol, which adduct has a softening point of between about 79° C. and 125° C., and preferably 90° C. and 125° C., and a WPE of 400 to 932, and (2) a polyfunctional anhydride, such as trimellitic anhydride and (3) an activator for the anhydride comprising a metal salt or a heterocyclic compound possessing in the ring a substituted imino group and a secondary amino group and preferably an imidazole compound, and (4) if desired, fillers, pigments and the like. It has been surprisingly found that these special compositions correct all of the difficulties noted above, namely, the cure at a fast rate at moderate temperatures and the obtaining of products having superior mechanical and electrical properties. The new compositions, for example, can be cured in from about 1 to 5 minutes at 300° F. to form hard solid products having good mechanical properties, such as good room temperature flexural, tensile and impact strengths. In addition, the resulting product has good electrical properties, good solvent and chemical resistances, and excellent adhesion to metals and the like. Furthermore, even though the compositions are heat-curable, they have good storage stability at room temperature. Evidence of such superior properties may be found in the working examples at the end of the specification.

The new compositions are prepared by a unique dry blending process as described hereinafter. The compositions could not be prepared by conventional fusion techniques as the mixing temperatures of the fusion process are in the range of 200° F. to 300° F. and this would cure the compositions.

The new compositions are particularly suited for many applications, such as in the electrical field, where 300° F. cure is the maximum temperature that can be tolerated by many electrical components.

The special adducts used in the preparation of the new compositions of the invention comprise the acetone-soluble epoxy containing adducts obtained by reacting polyepoxides, and preferably liquid glycidyl polyethers of polyhydric phenols, with polyamines which are preferably aromatic polyamines in controlled proportions so as to form solid adducts having a softening point between 79° C. and 125° C. and preferably to 125° C. and a WPE of 400 to 932.

The polyepoxides used in making the adducts are those organic materials which have more than one vic-epoxy group, i.e., more than one

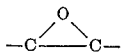

group, which group may be a terminal group, i.e., a

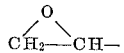

group or in an internal position. The polyepoxides may be saturated or unsaturated, aliphatic, cycloaliphatic, aromatic or heterocyclic and may be substituted with substituents, such as chlorine, hydroxyl groups, ether radicals and the like.

Examples of such polyepoxides include, among others, 1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-hydroxy-3,4-epoxybutoxy)-diphenyl dimethylmethane,
1,3-bis(4,5-epoxypentoxy)-5-chlorobenzene,
1,4-bis(3,4-epoxybutoxy)-2-chlorocyclohexane,
1,3-bis(2-hydroxy-3,4-epoxybutoxy)benzene,
1,4-bis(2-hydroxy-4,5-epoxypentoxy)benzene.

Other examples include the epoxy polyethers of polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (bisphenol A), 2,2-bis(4-hydroxyphenyl)butane, 4,4'-dihydroxybenzophenone, bis(4-hydroxyphenyl)ethane, 2,2-bis(4-hydroxyphenyl) pentane and 1,5-dihydroxynaphthalene. The halogen-containing epoxides may be further exemplified by 3-chloro-2,3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated Polyethers A, B, C and D.

Another group of polyepoxides comprises the polyepoxy polyethers obtained by reacting, preferably in the presence of an acid-acting compound, such as hydrofluoric acid, or of the aforedescribed halogen-containing epoxides, such as epichlorohydrin, with a polyhydric alcohol, and subsequently treating the resulting product with an alkaline component. As used herein and in the claims, the expressions "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetrial, sorbitol, mannitol, pentaerythritol, polyallyl alcohol, polyvinyl alcohol, inositol, trimethylolpropane, bis(4-hydroxycyclohexyl)dimethylmethane and the like.

The preparation of suitable polyepoxide polyethers is illustrated in U.S. Pat. No. 2,633,458 as Polyether F.

Particularly preferred members of the group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4, and a molecular weight between 30 and 1000.

Another group of polyepoxides includes the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut, and dehydrated castor oil, methyl linoleate, butyl linoleate, ethyl 9,12-octadecadienoate, butyl 9,12, 15-octadecatrienoate, ethyl eleostearate, octyl 9,12-octadecadienoate, methyl eleostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate, di(2,3-epoxybutyl)-oxalate, di(2,3-epoxyhexyl)succinate, di(2,3-epoxyoctyl)-tetrahydrophthalate, di(4,5-epoxydodecyl)maleate, di-(2,3-epoxybutyl)terephthalate, di(2,3-epoxypentyl)thiodipropionate, di(2,3-epoxybutyl)citrate and di(4,5-epoxyoctadecyl)malonate, as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycycloethyl 3,4-cyclohexanoate, 2,3-epoxycyclohexylmethyl, 2,3-epoxycyclohexanoate, and 3,4-epoxycyclohexyl 4,5-epoxyoctanoate, and the like.

Another group of materials having internal epoxy groups include expoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl, 7,8,11,12-diepoxyoctadecanedioate, dioctyl 10,11-diethyl-8,9,12,13-diepoxyeicosanedioate, dicyclohexyl 3,4,-5,6-diepoxycyclohexane-dicarboxylate, dibenzyl 1,2,4,5- diepoxycyclohexane-1,2-dicarboxylate and diethyl 5,6,10, 11-diepoxyoctadecyl succinate.

Still another group comprises the epoxidized polyesters obtained by reacting an unsaturated polyhydric alcohol and/or unsaturated polycarboxylic acid on anhydride groups, such as, for example, the polyester obtained by reacting 8,9,12,13-eicosanedienedioic acid with ethylene glycol, the polyester obtained by reacting diethylene glycol with 2-cyclohexane-1,4-discarboxylic acid and the like, and mixtures thereof.

Another group comprises the epoxidized polymers and copolymers of diolefins, such as butadiene. Examples of this include, among others, butadiene-acrylonitrile copolymers (hycar rubbers), butadienestyrene copolymers and the like.

Still another group includes the epoxidized hydrocarbons, such as epoxidized 2,3-bis-cyclohexenyl)propane, 2,2-bis(cyclohexenyl)butane, 8,10-octadecadiene and the like.

The other component to be used in making the special adducts comprise an amine, and preferably an aromatic amine. These amines have at least two hydrogen attached to amino nitrogen and the amino nitrogen is or are preferably attached to an aromatic ring. Examples of the amines include among others, aniline, methylene dianiline, meta-phenylene diamine, meta-aminophenol, cyclohexylamine, hexamethylene diamine, toluidine, alpha-naphthylamine, beta-naphthylamine, aminodiphenyl, piperazine, N,N'-dimethyl-m-phenylenediamine, 4,4'-diaminophenylsulfone, 4,4'-diaminophenylpropane, 4,4'-diaminodiphenylethane, and the like, and mixtures thereof. Particularly preferred amines to be used include the primary amines and preferably aromatic primary mono- and diamines possessing from 1 to 2 amino nitrogen attached to aromatic rings and containing from 6 to 24 carbon atoms.

The adducts are prepared by combining one or more of the above-described polyepoxides with one or more of the above-noted amines and heating the resulting mixture. In order to obtain the desired adducts instead of gelled resinous masses which are useless for the present purpose, it is necessary that an important detail be observed, namely, that a proper proportion of reactants be used. In order to obtain the desired products, one should employ a slight excess of the polyepoxide. The equivalent excess of the polyepoxide should vary from about .33 to .033 equivalents. By chemical equivalent amount as used herein is meant that amounts needed to furnish one epoxide group for every amino hydrogen.

If one uses an amine which has a functionality greater than 2, the amount of polyepoxide and amine used should be such that the total overall average functionality of reactants should be between 2 and 2.5.

This overall functionality can be determined by the following equation:

$$\frac{\frac{(X)(WX)}{(MX)} + \frac{Y(WY)}{(MY)} + \ldots^1}{\text{Total number of moles per 100 grams of reactants}} = 2 \text{ to } 2.5$$

[1] If more than one amine or polyepoxide is used, the equation should be continued with the same information about that reactant.

X = number of epoxy groups per mole of the polyepoxide
MX = molecular weight of the polyepoxide
WX = weight percent of total reactants of polyepoxide
Y = number of amine hydrogen atoms on amine molecule
MY = molecular weight of the amines
WY = weight percent of total reactants of amine The temperature employed in the formation of the adducts may vary from about 20° C. to 250° C. It is generally preferred to initiate the condensation at a low temperature, e.g., 20° C. to 110° C., and then allow it to exotherm to a temperature of about 150° C. to 250° C. Cooling may be applied as needed. The period at the higher temperature should be as short as possible, e.g. 1 to 20 minutes, in order to avoid danger of a runaway reaction. The reaction is preferably effected under atmospheric pressure, although superatmospheric or subatmospheric pressures may be utilized as desired.

Solvents or diluents may be employed in the reaction if desired, but in most cases one or more of the reactants will be liquid and the mixing can be effected without the use of solvents. Suitable solvents, if needed, include xylene, benzene, cyclohexane, dioxane, diethyl ether and the like.

The adducts may be recovered from the reaction mixture by any suitable means. If solvents or diluents are employed, they may be removed by evaporation, distillation, and the like. In the absence of such solvents or diluents, the adducts are generally recovered and used as the crude reaction product.

The adducts to be used in the process of the invention will be solid products having a softening point between 79° C. to 125° C., and more preferably 90° C. to 125° C. These softening points are determined by the Hercules method. The adducts will also have a WPE value of 400 to 932. WPE is weight in grams of the condensate needed to supply one epoxy group. It is determined by a silver nitrate HCl method. According to this method, the condensate is added to a solution of HCl in tetrahydrofuran wherein the epoxy group reacts with the HCl. The solution is then back-titrated with silver nitrate to determine unreacted HCl. A sample without the condensate is also liberated with AgNO₃. The calculation is determined by the formula $$\frac{\left(\begin{array}{c}\text{ml AgNO}_3 \text{ for}\\\text{reagent sample}\end{array} - \begin{array}{c}\text{ml AgNO}_3 \text{ for}\\\text{sample containing}\\\text{condensate}\end{array}\right)\left(\begin{array}{c}\text{Normality}\\\text{of AgNO}_3\end{array}\right)}{\text{Weight of Condensate Sample}}$$

$$= X \text{ (meq) epoxy per gram sample}$$

$$\frac{1(100)}{\frac{(X)(100)}{(1000)}} = \text{WPE or } \frac{1000}{(X)} = \text{WPE}$$

In general, the lower the WPE, the more reactive the adduct. Adducts having WPE over 625 are generally preferred when highly flexible products are desired.

The preparation of some of the adducts by the above method using aniline as the amine and Polyether A of U.S. 2,633,458 as the polyepoxide is shown in Table I.

TABLE I.—ANILINE-BASED CONDENSATES

| Adduct | A | B | C | D | E | F | G | H | I | J |
|---|---|---|---|---|---|---|---|---|---|---|
| Batch size, lb | 60.0 | 7.9 | 7.9 | 60.0 | 7.9 | 60.0 | 7.9 | 60.0 | 1.3 | 1.8 |
| Reaction conditions: | | | | | | | | | | |
| Composition, percent w: | | | | | | | | | | |
| Polyether A | 87.2 | 84.9 | 84.3 | 89.7 | 86.2 | 91.8 | 87.4 | 88.7 | 84.3 | 85.8 |
| Aniline | 12.8 | 14.6 | 15.2 | 5.3 | 9.8 | 5.4 | 10.1 | 5.2 | | 13.5 |
| Salicylic acid | | 0.5 | 0.5 | | 0.5 | | 0.5 | | | |
| Methylenedianiline | | | | 5.0 | 3.5 | | | | | |
| Meta-phenylenediamine | | | | | | 2.8 | 2.0 | | | |
| m-Aminophenol | | | | | | | | 6.1 | | |
| Cyclohexylamine | | | | | | | | | 15.7 | |
| Hexamethylenediamine | | | | | | | | | | 0.7 |
| Initiation temp., °C | 110 | 49 | 62 | 120 | 52 | 116 | 50 | 57 | 39 | 110 |
| Time to max. temp., min | 20 | 30 | 19 | 16 | 27 | 18 | 28 | 40 | 39 | 23 |
| Max. temp., °C | 189 | 192 | 201 | 185 | 184 | 189 | 188 | 158 | 176 | 213 |
| Time at max. temp., min | 14 | 11 | 12 | 20 | 3 | 20 | 1 | 19 | 20 | 3 |
| WPE | 552 | 821 | 932 | 417 | 640 | 412 | 632 | 450 | 781 | 731 |
| Hercules softening point, °C | 86 | 101 | 104 | 83 | 100 | 79 | | 85 | 97 | 97 |

The second component in the new compositions of the invention comprise the polyfunctional anhydrides, i.e., anhydrides having at least one cyclic anhydride group, i.e., a

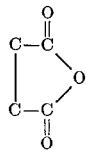

group and preferably one other functional grouping, such as a carboxyl group, another anhydride group, etc. Examples of such anhydrides include, among others, solid anhydrides, such as trimellitic anhydride, benzophenone 3,3',4,4'-ttracarboxylic acid anhydride; 2-bromo-3,3',4,4'-benzophenone tetracarboxylic dianhydride; 2-carboxy-2'-sulfo-3,3',4,4'-benzophenone tetracarboxylic dianhydride; 2-amino-2,3',4,4'-benzophenone tetracarboxylic dianhydride; and 5-nitro-2,3',4'-benzophenone tetracarboxylic dianhydride, and derivatives of such anhydrides as anhydrides of the formula

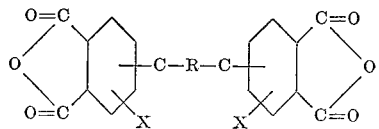

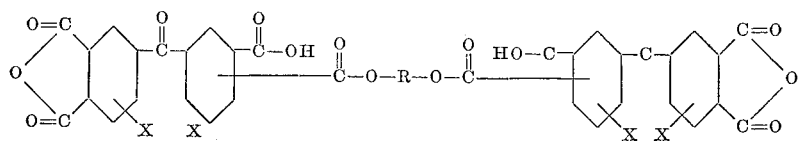

wherein joining group R may be any organic radical and preferably a hydrocarbon or oxahydrocarbon radicals and X may be hydogen, halogen, —NO₂, —COOH, —SO₃H or —NH₂. Particularly preferred groups represented by R are hydrocarbon radicals containing from 2 to 10 carbon atoms, and preferred groups represented by X are hydrogen, —COOH, halogen and —NH₂.

Examples of less preferred anhydrides to be used include pyromellitic anyhdride and partial esters of pyromellitic anyhdride and polyhydric alcohols, cyclopentane dianhydride, Nadic dianhydride, benzene maleic dianhydride, and the like.

The amount of the anhydride to be used in the new compositions may vary over a wide range. In general, it is preferred to utilize at least .8 equivalent of the anhydride per equivalent of epoxide. By equivalent amount is meant that amount needed to furnish one anhydride group per epoxy group. Preferably the anhydride and adduct are combined in chemical equivalent ratios varying from about .5 to 1 to 1.5:1. As represented in terms of parts per 100 parts of resin, one preferably employs from 5 to about 20 parts of the anhydride per 100 parts of the adduct.

Activators for the anhydrides to be used in the new compositions comprise the metal salts, and preferably the stannous salts and the heterocyclic amines possessing in the ring a substituted imino group and a secondary amino group, and preferably an imidazole compound.

Stannous salts which are especially suitable for catalyzing the present compositions are the stannous salts of monocarboxylic acids having at least 5 carbon atoms, and preferably fatty acids containing from 5 to 20 carbon atoms, and still more preferably from 6 to 12 carbon atoms. Suitable stannous salts include, among others, stannous caproate, stannous octoate, stannous laurate, stannous palmitate, stannous stearate, stannous oleate, and stannous naphthenate. Stannous octoate is particularly preferred because it promotes exceptionally rapid cures and imparts outstanding flexibility as well as high impact strength and solvent resistance to the cured molding compositions. The stannous salt activators are preferably employed in concentrations from about .01 to 5 parts per one hundred parts of the adducts to be cured.

Another type of activator for the anhydride that can be used includes the above-noted heterocyclic amines. Preferred examples of these include the imidazoles, such as compounds of the formula:

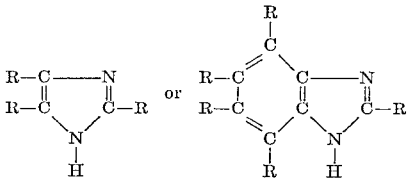

wherein R is hydrogen, halogen or an organic radical, such as hydrocarbon radical or substituted hydrocarbon radical as the ester, ether, amide, imide, amino, halogen or mercapto substituted hydrocarbon radicals. Especially preferred are the imidazoles wherein R is hydrogen or a hydrocarbon radical, and preferably an alkyl, alkenyl, cycloalkyl, cycloalkenyl, aryl, alkaryl or arylalkyl radicals, and particularly those containing no more than 15 carbon atoms. Examples of such compounds include, among others, imidazole, 2-ethyl-4-methyl imidazole, 2,4-dioctyl imidazole, 2-cyclohexyl-4-methyl imidazole, 2-butoxy-4-allyl imidazole, 2-carboethoxybutyl-4-methyl imidazole, 2,4-dichlorobutyl imidazole, 2-octyl-4-hexyl imidazole, and 2-ethyl-4-phenyl imidazole, and mixtures thereof. Other examples include the salts and other derivatives of the above-noted imidazole compounds as their monocarboxylic acid salts, such as, for example, their acetate, benzoate, formate, phosphate and lactate salts, etc. In general, it is preferred to utilize from .05 to 6 parts of the heterocyclic amine per 100 parts of the adduct, preferred amounts varying from .1 part to 5 parts of the heterocyclic amine per 100 parts of the adduct.

The new heat-curable powdered epoxy resin compositions of the present invention are obtained by effecting a special type of dry blending of the above-noted adduct, anhydride and activator. The blending is accomplished by utilizing the agglomeration principle as noted hereinafter.

When used in the dry blending process, it is preferred that the adduct be preground so that the particles have a size less than 500 microns.

In this blending, the components are added, in any order, to the pebble mill which already contains the grinding media charge. After charging, the pebble mill is run for a sufficient time to assure proper particle agglomeration and film flow. The time period required for agglomeration is dependent on (1) the size of the pebble mill used, (2) the rotational speed of the mill, and (3) the volume ratio of media to formulation components. The time period in the mill required for the proper film flow to be developed is very much dependent on the type of grinding media used (i.e., size, shape and media density). In general, the volume ratio of grinding media to total mill volume can be varied considerably, depending upon the above-noted factors; however, such a ratio is usually between about 25% and 75% with about 50% being an especially good ratio. Upon termination of the grinding period, the powder is discharged and without further treatment is ready for use.

A feature of the above process is the utilization of high-density grinding media. The high-density grinding media may be spherical or cylindrical in shape with cylindrical media being preferred. The spherical media may range from about ¼ inch in diameter to 2 or more inches in diameter with a preferred diameter being in the range of from ¾ inch to 1½ inches in diameter. The ratio of height to diameter of the cylinders may range from about 0.5:1 to about 3:1 with a 1:1 ratio being preferred. The term "high density" as used herein means a density which is at least 25% greater than porcelain and preferably at least 40% greater than porcelain. The density of the grinding media may be expressed in terms of specific gravity based on water as 1.0. Thus, the term "high density" as used herein means that the grinding media has a specific gravity of at least 2.75 and preferably greater than 3.5. The grinding media may be metallic, semi-metallic or non-metallic. In general, non-metallic media is preferred, although grinding media such as steel may be used in applications where metallic contamination is not a limiting consideration.

The volume ratio of media to formulation components may vary through a wide range with a ratio of from about 1:1 to about 5:1 being employed usually. Very good results are obtained when the weight ratio of media to components is from about 1:1 to about 10:1, with a ratio of about 5:1 to 10:1 preferred.

As noted hereinbefore, the time required to assure proper agglomeration and film flow is dependent on many factors. Under the precise conditions, the pulverized composition is ready for use after about six hours. It is generally preferred to screen the product to pass 100% through an 80 to 100 mesh screen.

While the adduct may be added to the pebble mill in flake or lump form, i.e., without pregrinding, it is generally preferred to pregrind the polyepoxide to approximately 20 mesh.

It will be appreciated that the present one-step process utilizing a pebble mill and high-density media not only provides a simple process for pulverizing the ingredients into a fine powder but also forms an agglomerate of the particles of adduct and heterocyclic amine so that they do not separate on standing.

The new composition of the invention will appear as finely divided powder and have a particle size varying from less than 1 micron to 175 microns. They can be connected to hard insoluble products by heating at 300° F. The composition is soluble in ketone, such as methyl isobutyl ketone, and can be used to form coating solution and the like.

The new heat-curable epoxy resin compositions of the present invention may be utilized for a great many applications. They may be used, for example, as molding compositions and can be pressed, extruded or otherwise utilized in the formation of molded plastic articles. In these applications, curing temperatures ranging from abount 250° F. to 350° F. are generally preferred. Pressures may vary from about 100 p.s.i. to 1000 p.s.i The new compositions may also be utilized as powdered adhesives or bonding agents to adhere various surfaces, such as metal, wood, ceramics, plaster, cement, and the like together. In these applications the powdered composition is placed alone or in combination with liquid adhesive materials between the desired surfaces to be bonded and heat pressure applied as noted above.

The new compositions are particularly suited for use in the formation of coatings as by spraying, dipping, etc. onto heated articles and then subjecting the coated product to post-cure conditions. The compositions are particularly suited for use in fluidized bed systems for coatings. In this application, additional materials, such as fillers, thixotropic agents, pigments, accelerators, etc. are added to the composition and the resulting mixture utilized in the fluidized bed.

Suitable fillers, which may be employed as desired, includes, among others, aluminum powder, mica, bentonites, clays, synthetic resins and polymers, rubbers, ignited $Al_2O_3$, short-fiber asbestos, wood flour, carbon black, silica, zinc dust, talc and the like. A large number of fillers are available commercially in particle sizes from about 0.1 micron upward.

The quantity of fillers used is dependent upon many factors such as cost, particle size, particle shape, absorption characteristics and loading volume. The lightweight fillers such as asbestos and uncompressed mica are employed in ratios below 50 phr. (parts per one hundred parts of polyepoxide) and generally below 35 phr.; the medium weight fillers, such as talc and powdered aluminum, may be employed up to about 100 phr.; and the heavier fillers may be employed up to about 150 phr. In general, however, in order to optimize raw material costs without minimizing coating properties, the ratio of filler to polyepoxide ranges from about 10 to 60 phr.

It is generally desirable, although not necessary, to employ a thixotropic agent to prevent dripping or sagging at high film build. Any of the thixotropic agents normally used in the art are suitable for use in the present compositions, including silica aerogels, bentonite clays and their derivatives, castor oil derivatives and the like.

The proportions of the adducts, anhydride, activator, thixotropic agents and other additives will vary within wide ranges. However, rapid cure and excellent film flexibility is achieved when the final composition comprises from about 50 to 80 parts by weight of adduct and from about 1 to 20 parts by weight of anhydride, 0.1 to 10 parts of the activator and from about 5 to 50 parts by weight of the filler.

The fillers, pigments, etc. can be added during the dry blending of the adduct, anhydride and activator or after that composition has been prepared. In the latter case, the fillers and pigments may be combined by grinding or otherwise mixing the powder together.

Any of the conventional fluidized bed coating techniques may be employed wherein the fluidized bed comprises the instant compositions maintained in a dense turbulent condition by means of a gaseous stream continuously introduced into the fluidized bed. In general, in carrying out a fluidized bed coating process, the article is preferably heated to a temperature of at least 100° C., and preferably between about 120° and 250° C. before it is dipped into the fluidized bed. If an article is to be completely coated, it should, of course, be completely immersed in the fluidized bed. The article is preferably moved backward and forward in the bed, over a period of time determined by the desired thickness of coating. For the product of thin coating, i.e., less than 0.015 inch thick, the period during which an article is dipped or immersed into the bed is usually less than three seconds.

After the article has been in contact with the fluidized bed for the desired time, it is removed, and the coating cured by heating to at least 125° C., and preferably between 150 and 250° C.

The compositions of the instant invention may also be sprayed as by a compressed air spray gun or electrostatically, i.e., by maintaining a difference in electrostatic charge between the particles and the article to be coated.

To illustrate the manner in which the present invention may be carried out, the following examples are given. The examples are given only to illustrate the invention and are not to be regarded as limiting the scope of the invention in any way. Unless otherwise indicated, parts and percentages disclosed in the examples are by weight. The polyethers referred to by letter, such as Polyether A, are those disclosed in U.S. 2,633,458.

EXAMPLE I

This example illustrates the preparation of a heat-curable powdered epoxy resin composition from (1) an adduct of Polyether A as disclosed in U.S. 2,633,458 and aniline, (2) trimellitic anhydride, and (3) imidazole.

An adduct was prepared from Polyether A and aniline having a WPE of 889 and a softening point of 100–109. This adduct was combined with trimellitic anhydride, imidazole, pigment and filler according to the following recipe:

| | Parts by weight |
|---|---|
| Adduct | 471.0 |
| Trimellitic anhydride | 84.8 |
| Imidazole | 4.7 |
| Titanium dioxide | 24.0 |
| Silica filler | 216.0 |
| | 800.5 |

The adduct was first preground to approximately 20 mesh. All of the components were then placed in a 1½ gallon pebble mill containing 5500 grams of grinding media. After charging, the mill was run at a peripheral speed of 230 ft./minute for 15 hours. On completion of grinding, the powder was discharged from the mill. The sieve analysis of the resulting product is as follows:

| Sieve size: | Percent retained |
|---|---|
| No. 50 | 1.6 |
| No. 80 | 2.8 |
| No. 100 | 4.0 |
| No. 200 | 17.6 |
| No. 325 | 68.0 |
| Pan | 4.4 |

The above-noted powder was then heated at 320° F. to determine the gel time. The results are shown below according to the sieve size:

| | Sec. |
|---|---|
| No. 50 | 28.3 |
| No. 80 | 30 |
| No. 100 | 29.2 |
| No. 200 | 28.2 |
| No. 325 | 28.5 |
| Pan | 29.1 |

Initial gel time was 29.1 seconds at 320° F. After storage at room temperature for 90 days, the combined powder had a gel time of only 29.2 seconds at 320° F.

The above-noted powder was used to coat a steel panel in the following manner. A solvent-cleaned 1½ inch by 6 inches gauge, cold-rolled steel panel was heated on a carefully controlled hot plate to a temperature of 325° F. A stream of the powder was directed at the panel with a Binks Model 171 Flocking Gun (OB–11 nozzle). The panel was allowed to remain on the hot plate for a 30-second cure cycle. The film was 7–10 mils thick. The coating was hard but flexible and had excellent resistance to solvents. Properties of the cured film are shown in Table II.

EXAMPLE II

Example I was repeated with the exception that the activator was stannous octoate and the components were combined in the following proportions:

| | Parts by weight |
|---|---|
| Adduct | 471.0 |
| Trimellitic anhydride | 84.8 |
| Stannous octoate | 4.7 |
| Titanium dioxide | 24.0 |
| Silica 219 | 216.0 |
| | 800.5 |

The components were dry-blended as shown in Example I.

The gel times in seconds of the particles according to sieve size are as follows:

| Sieve size No. | 50 | 80 | 100 | 200 | 325 | Pan |
|---|---|---|---|---|---|---|
| Percent retained | 2.4 | 16.8 | 35.2 | 41.7 | | 1.2 |
| Gel time (sec.) | 29.4 | 29.0 | 30.1 | 30.3 | | 30.1 |

Initial gel times for the combined particles was 30.3 seconds at 320° F. After 90 days' storage at room temperature, the gel time was still 30.3 seconds.

The properties of panels coated with the powder by the process of Example I are shown in Table II.

EXAMPLE III

Example I was repeated with the exception that the anhydride was benzophenone dianhydride. The formula employed was as follows.

| | Parts by weight |
|---|---|
| Adduct | 490.0 |
| Benzophenone dianhydride | 66.2 |
| Imidazole | 2.5 |
| Titanium dioxide | 24.0 |
| Silica filler | 216.0 |
| | 798.7 |

These components were dry-blended as in Example I.

The sieve size and gel times of the particles are shown below.

| Sieve size No. | 50 | 80 | 100 | 200 | 325 | Pan |
|---|---|---|---|---|---|---|
| Percent retained | 2.0 | 3.6 | 24.4 | 52.8 | | 16.8 |
| Gel time (sec.) | 9.0 | 9.8 | 9.2 | 9.4 | | 9.2 |

Steel panels were coated with the composition as shown in Example I. Properties of the coatings are shown in Table II.

EXAMPLE IV

Example I was repeated with the exception that the anhydride employed was benzophenone dianhydride and the activator was stannous octoate.

The formula employed was as follows:

| | Parts by weight |
|---|---|
| Adduct | 490.0 |
| Benzophenone dianhydride | 66.2 |
| Stannous octoate | 4.9 |
| Titanium dioxide | 24.0 |
| Silica filler | 216.0 |
| | 801.1 |

These components were dry-blended as in Example I.

The sieve size and gel times of the particles of the composition are shown below.

| Sieve size No. | 50 | 80 | 100 | 200 | 325 | Pan |
|---|---|---|---|---|---|---|
| Percent retained | 1.6 | 4.0 | 32.4 | 46.3 | 14.8 | |
| Gel time (sec.) | 12.8 | 12.8 | 12.8 | 12.2 | 12.3 | |

Steel panels were coated with the above composition as shown in Example I. Properties of the coatings are shown in Table II.

EXAMPLE V

Example I was repeated with the exception that the adduct employed was an adduct of Polyether A and aniline having a WPE of 821 and a melting point of 101° C.

The formula employed was as follows:

| | Parts by weight |
|---|---|
| Adduct | 100.0 |
| Trimellitic anhydride | 19.5 |
| Imidazole | 3.0 |
| Titanium dioxide | 3.0 |
| Silica filler | 25.0 |
| | 150.5 |

These components were dry-blended as in Example I.

The composition had a gel time of 20.3 seconds at 320° F. and after storage at room temperature of 90 days had a gel time of 17.0 seconds at 320° F.

The composition was used to coat steel panels as shown in Example I. The coating was hard but flexible and had good resistance to solvents. The results are shown in Table II.

EXAMPLE VI

Example I was repeated with the exception that the adduct employed was an adduct of Polyether A and m-aminophenol having a WPE of 540 and a softening point of 104° C.

The formula employed was as follows:

| | Parts by weight |
|---|---|
| Adduct | 100.0 |
| Trimellitic anhydride | 29.6 |
| Imidazole | 0.5 |
| Titanium dioxide | 3.0 |
| Silica filler | 25.0 |
| | 158.1 |

These components were dry-blended as in Example I.

The composition had a gel time of 6.4 seconds at 320° F. and after storage at room temperature of 90 days had a gel time of 5.0 seconds at 320° F.

The composition was used to coat steel panels as shown in Example I. The coating was hard but flexible and had good resistance to solvents. The results are shown in Table II.

EXAMPLE VII

Example I was repeated with the exception that the adduct was an adduct of Polyether A and m-aminophenol having a WPE of 540 and a softening point of 104° C., and the activator was stannous octoate.

The formula employed was as follows:

| | Parts by weight |
|---|---|
| Adduct | 100.0 |
| Trimellitic anhydride | 29.6 |
| Stannous octoate | 1.0 |
| Titanium dioxide | 3.0 |
| Silica filler | 25.0 |
| | 158.6 |

These components were dry blended as in Example I.

The composition had a gel time of 7.0 seconds at 320° F. and after storage at room temperature of 90 days had a gel time of 2.4 seconds at 320° F.

The composition was used to coat steel panels as shown in Example I. The coating was hard but flexible and had good resistance to solvents. The results are shown in Table II.

EXAMPLE VIII

Example I was repeated with the exception that the imidazole was replaced by benzimidazole. Related results are obtained.

EXAMPLE IX

Example I was repeated with the exception that the adduct employed was an adduct of the diglycidyl ether of resorcinol and m-phenylene diamine. Related results are obtained.

EXAMPLE X

Example I was repeated with the exception that the activator employed was as follows:

2-ethyl-4-methyl imidazole lactate
benzoate salt of imidazole
acetate salt of 2-ethyl-4-methyl imidazole
benzimidazole acetate
benzimidazole phosphate
benzimidazole formate Related results are obtained.

TABLE II

| Condensate | Resin WPE [1] | Softening point, °C. [2] | Curing agent Type | Stoichiometry, Percent [4] | Catalyst Type | Phr. [5] | Gel time, 320° F. sec. | Cure, min. [3] >60′ MIBK T=300° F. | >60′ MEK T=300° F. |
|---|---|---|---|---|---|---|---|---|---|
| Polyether A/aniline | 889 | 100–109 | Trimellitic anhydride | 125 | Imidazole | 1 | 29.1 | 3 | 7 |
| Do | 889 | 100–109 | ___do___ | 125 | Stannous octoate | 1 | 30.3 | 3 | 5 |
| Do | 889 | 100–109 | Benzophenone dianhydride | 75 | ___do___ | 1 | 12.7 | 3 | 5 |
| Do | 889 | 100–109 | ___do___ | 75 | Imidazole | 0.5 | 9.1 | 1 | 4 |
| Do | 821 | 101 | Trimellitic anhydride | 125 | ___do___ | 3 | 20.3 | 1 | 4 |
| Polyether A/m-aminophenol | 540 | 104 | ___do___ | 125 | Stannous octoate | 1 | 7.4 | 1 | 3 |
| Do | 540 | 104 | ___do___ | 125 | Imidazole | 0.5 | 6.4 | 1 | 3 |

[1] Determined by AgNO³/HCl method.
[2] Determined by Hercules Drop method.
[3] Cure measured by methyl isobutyl and methyl ethyl ketone resistance. Represents cure time and temperature necessary to obtain 60 minutes MIBK resistance and 60 minutes MEK resistance.
[4] Stoichiometric amounts of curing agent calculated as follows:
  (A) TMA mol. wt.=192 g.; Equivalent wt.=192/1.5=128 g.; 125% stoic.=128 g./WPE=125=128/889×125=18 phr.
  (B) BPDA mol. wt.=332 g.; Equivalent wt.=322 g./2;=161 g.; 75% stoic.=161 g./889=13.6 phr.
[5] Based on weight of resin.

We claim as our invention:

1. A powdered, heat-curable epoxy resin composition comprising a dry homogeneous blend of (1) an adduct of a polyepoxide having more than one vic-epoxy group and an aromatic amine possessing at least two active hydrogen atoms attached to amino nitrogen, which adduct is soluble in acetone, has a softening point of between about 79° C. and 125° C., and a WPE of 400 to 932 wherein WPE is the weight in grams needed to supply one epoxy group, (2) a polyfunctional anhydride, and (3) an activator for the anhydride comprising (a) a stannous salt of a monocarboxylic acid having from 5 to 20 carbon atoms, (b) an imidazole compound of the formula:

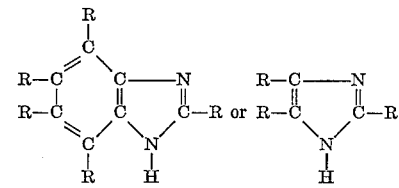

wherein R is hydrogen, halogen or hydrocarbon radicals or (c) a monocarboxylic acid salt of said imidazole compounds.

2. A powdered, heat-curable epoxy resin composition capable of curing in less than about 1 minute at 300° F. comprising a dry homogeneous blend of (1) finely divided particles of an adduct of a liquid polyglycidyl ether of 2,2-bis(4-hydroxyphenyl)propane and an aromatic amine possessing at least two active hydrogen atoms attached to amino nitrogen, which adduct is soluble in acetone, has a softening point of between about 90° C. and 125° C., and a WPE of 400 to 932 wherein WPE is the weight in grams needed to supply one epoxy group, (2) a solid polyfunctional anhydride, and (3) an activator for the anhydride comprising (a) a stannous salt of a monocarboxylic acid having from 5 to 20 carbon atoms, (b) an imidazole compound of the formula:

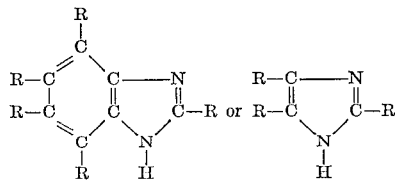

wherein R is hydrogen, halogen or hydrocarbon radicals or (c) a monocarboxylic acid salt of said imidazole compounds.

3. A powdered composition as in claim 2 wherein the amine is methylenedianiline.

4. A powdered composition as in claim 2 wherein the amine is aniline.

5. A powdered composition as in claim 2 wherein the amine is meta-aminophenol.

6. A powdered composition as in claim 2 wherein a greater part of the particles are retained by No. 200 sieve.

7. A powdered composition as in claim 2 wherein the composition also contains a silica filler and pigment.

8. A powdered composition as in claim 2 wherein the activator is an imidazole compound of the formula

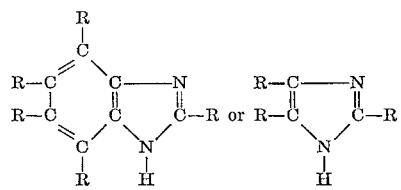

wherein R is hydrogen, or a hydrocarbon radical selected from the group consisting of alkyl, alkenyl, cycloalkyl, cycloalkenyl, aryl, alkaryl or arylalkyl radicals of not more than 15 carbon atoms.

9. A powdered composition as in claim 2 wherein the activator is imidazole.

10. A powdered composition as in claim 2 wherein the anhydride is trimellitic anhydride.

11. A powdered composition as in claim 1 wherein the anhydride is benzophenone dianhydride.

12. A process for converting the powdered composition of claim 1 to hard insoluble infusible product which comprises heating the composition to a temperature above 250° F. for a short period.

References Cited

UNITED STATES PATENTS

| 2,773,048 | 12/1956 | Formo et al. |
| 2,865,888 | 12/1958 | Greenlee. |
| 3,317,471 | 5/1967 | Johnson et al. |
| 3,394,105 | 7/1968 | Christie. |
| 3,362,922 | 1/1968 | Manasia. |

WILLIAM H. SHORT, Primary Examiner

T. E. PERTILLA, Assistant Examiner

U.S. Cl. X.R.

117—123, 127, 148, 161; 260—2, 18, 47, 78.4, 88.3